INVENTOR.
HARLAN J. EASTON
BY
Merchant & Gould
ATTORNEYS

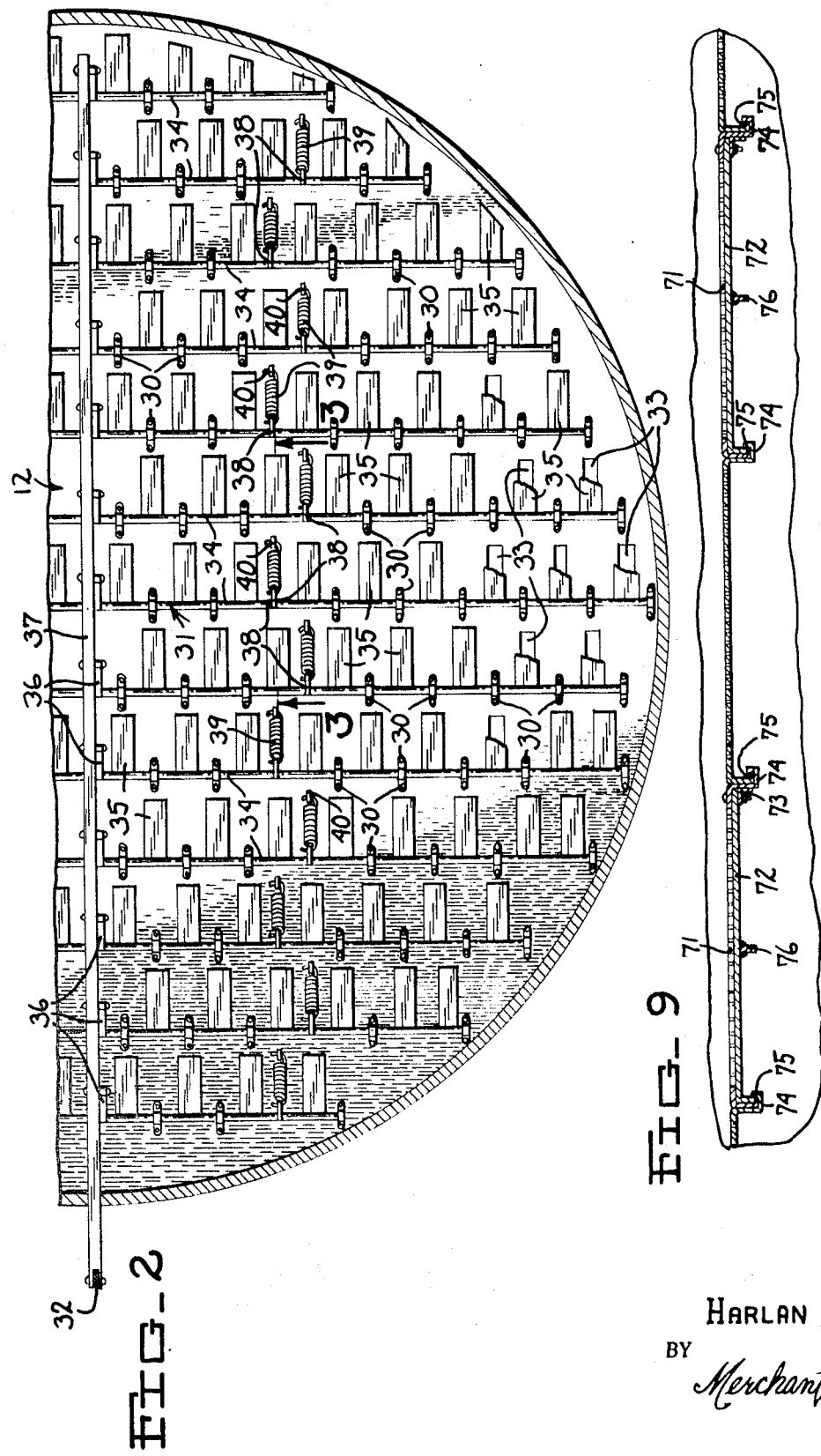

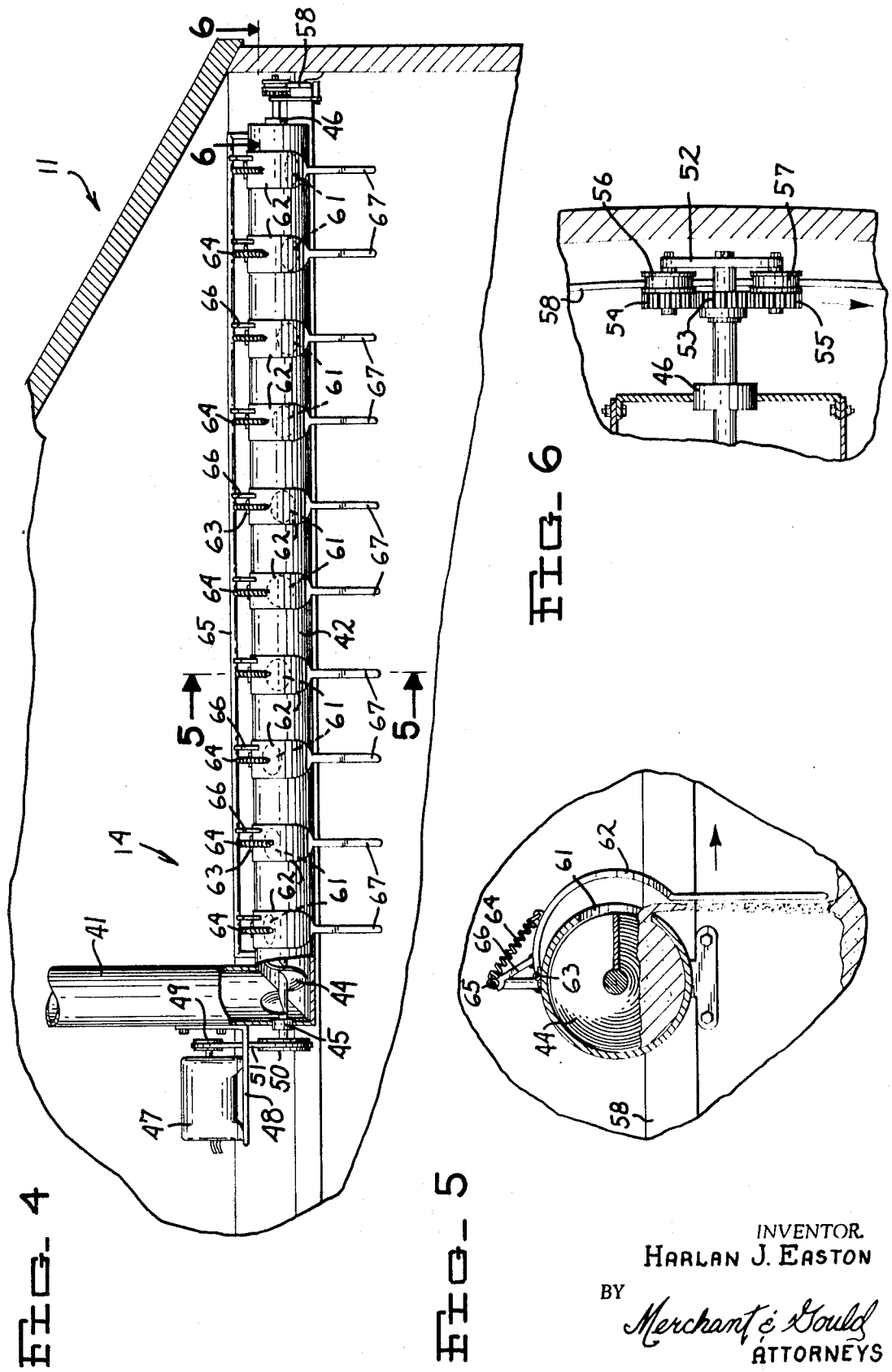

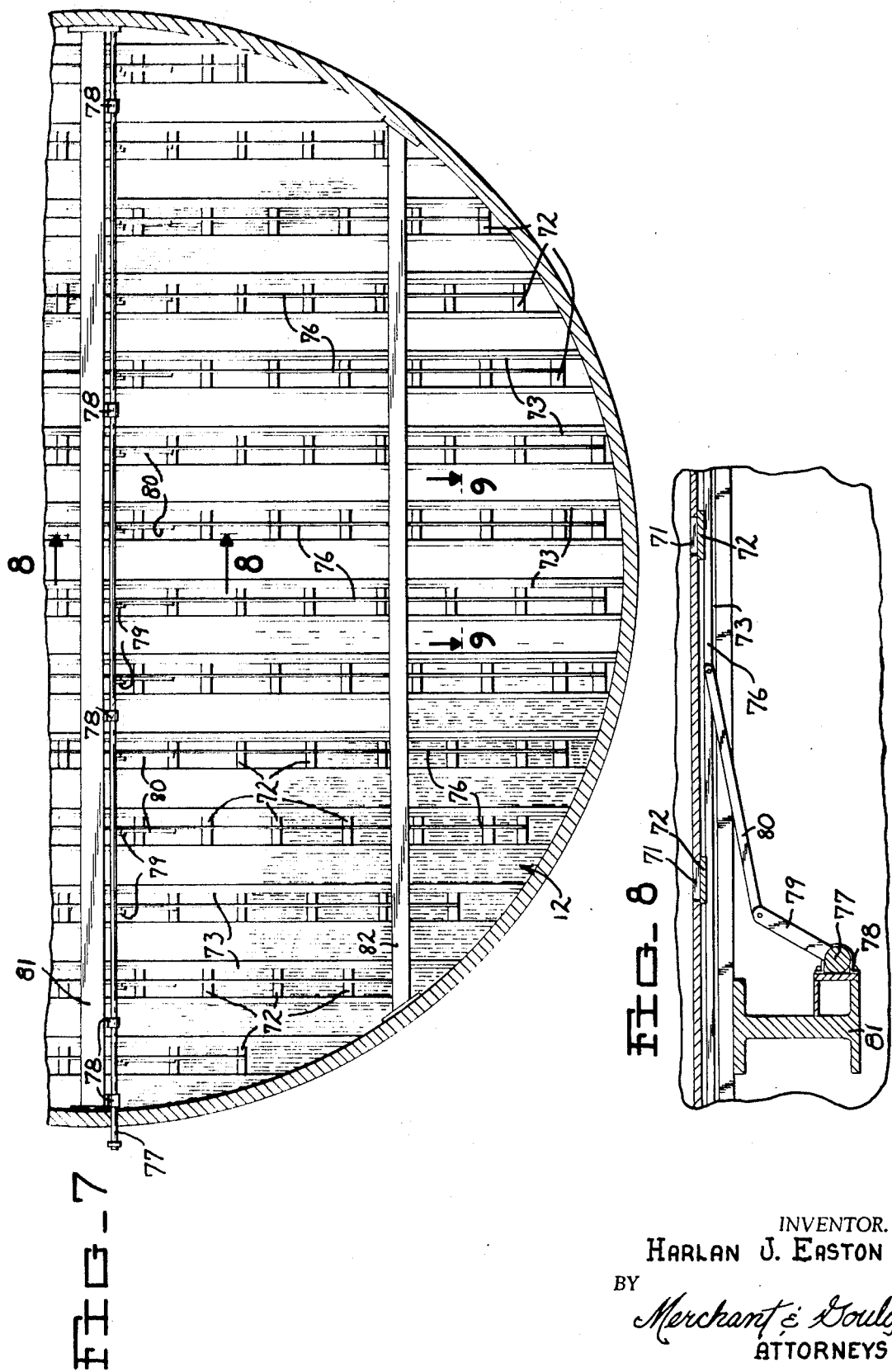

United States Patent Office 3,624,921
Patented Dec. 7, 1971

3,624,921
GRAIN DRYING AND STORAGE APPARATUS
Harlan J. Easton, Rte. 3, Box 607,
Blooming Prairie, Minn. 55917
Filed Aug. 12, 1969, Ser. No. 849,941
Int. Cl. F26b 19/00
U.S. Cl. 34—211                                       6 Claims

ABSTRACT OF THE DISCLOSURE

A grain drying and storage bin is disclosed that receives and evenly distributes grain over an upper floor grid where the grain is heated and dried. After drying is completed, the grain is transferred to a lower cooling floor by actuation of a linkage mechanism that simultaneously opens a plurality of openings in the upper grid.

---

The invention is related generally to the field of storage bins that include apparatus for drying grain and similar materials, and transferring the dried grain to a storage portion in the bin.

One desirable method of drying grain involves distributing a predetermined quantity of grain on an upper floor grid and forcing warmed air up through the grain. After drying, the grain is transferred to a lower floor for cooling and storage. Air-circulating fans may be used with the lower floor to effect cooling and proper ventilation of the dried grain.

Obviously, it is advantageous to dry as much grain as possible in a day, while maintaining relatively uniform drying throughout. A large upper floor grid can be used to achieve this, but the problem arises of transferring the vast quantity of dried grain to the cooling floor below with the least amount of time and difficulty. To my knowledge, existing apparatus for performing this function are cumbersome, expensive and require considerable time for the entire transfer.

My invention consists of including in the floor grid a plurality of apertures and apparatus associated therewith for simultaneously opening and closing the apertures. Because it forms part of the upper floor, the grain transferring apparatus does not occupy any of the storage space. It is easily operated by a single person, and requires no auxiliary power equipment. Lastly, the invention enables the grain to be transferred evenly to the lower floor in a minimum amount of time.

BRIEF DESCRIPTION OF THE DRAWINGS

FIG. 2 is a bottom view of the grain drying and storage bin of FIG. 1 taken along the line 2—2, showing in particular an upper floor grid and the apparatus associated therewith for transferring dried grain to a lower floor.

FIG. 4 is a front view of a mechanism for receiving and evenly distributing grain over the upper floor grid.

FIG. 5 is a side view of the grain distributing device of FIG. 4 in cross-section, taken along the line 5—5.

FIG. 6 is a top cross-sectional view of the grain distributing device of FIG. 4 in part, taken along the line 6—6.

FIG. 7 is an alternative embodiment of the upper floor grid and grain transferring apparatus.

FIG. 8 is a side cross-sectional view of the upper floor grid and grain transferring apparatus of FIG. 7, taken along the line 8—8.

FIG. 9 is a front cross-sectional view of the upper floor grid and grain transferring apparatus of FIG. 7, taken along the line 9—9.

DESCRIPTION OF THE PREFERRED EMBODIMENT

Figure 1:
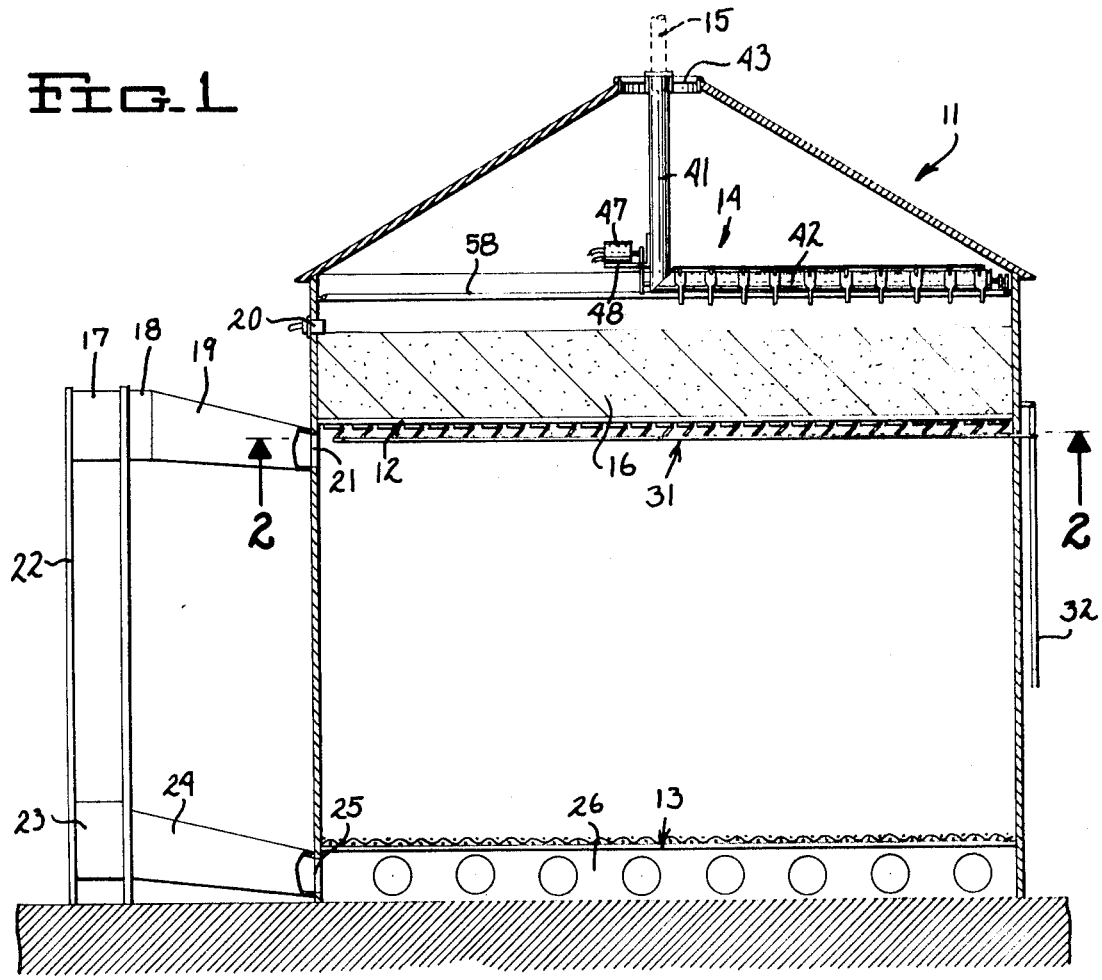
FIG. 1 is a side view in partial section of a grain drying and storage bin embodying the inventive principle.

FIG. 1 discloses a grain drying and storage apparatus represented generally by the numeral 11, which includes an upper floor grid 12 and a lower floor grid 13. Both floor grids 12 and 13 have a grid structure small enough to prevent grain and other such materials from falling therethrough, but large enough to permit adequate airflow to pass through and reach the grain.

Disposed above upper floor grid 12 is a grain-receiving and distributing apparatus shown generally at 14, which will be described in detail below. Distributing apparatus 14 receives grain through an opening 15 located at the top of bin 11, and evenly distributes grain to a predetermined depth over upper floor grid 12, as shown at 16. The grain depth is controlled in part by a switch 20 that responds to a predetermined grain level by turning off the grain distributing device 14.

Operating in association with upper floor grid 12 is a grain heating apparatus, which consists of a blower 17, a heating unit 18 and a duct 19 which communicates warm air to the inside of bin 11 through an opening 21. Blower 17 and heating unit 18 are held in place by a support 22.

A grain-transferring mechanism 31, which will be described in detail below, forms part of the upper floor grid 12 and is actuated by a handle 32 disposed outside bin 11.

Operating in association with lower floor grid 13 is a cooling and ventilating blower 23, which also rests on support 22, and a duct 24 that conducts air through an opening 25 in bin 11 to a plenum 26 disposed below lower floor grid 13.

Figure 3:
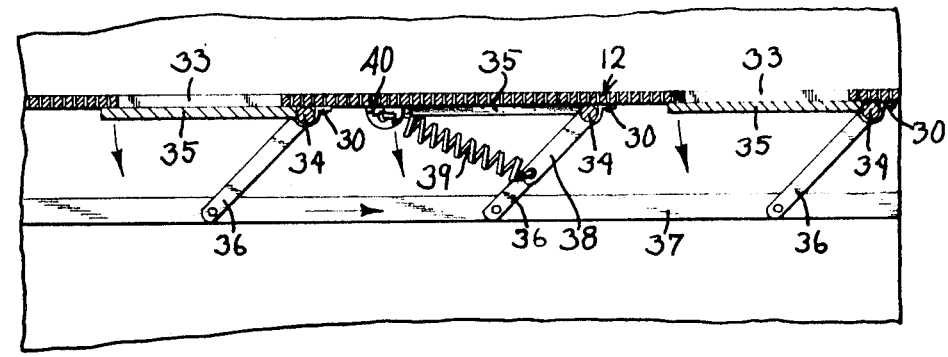
FIG. 3 is a side view of the upper floor grid and grain transferring apparatus of FIG. 2, taken along the line 3—3.

FIGS. 2 and 3 disclose the upper floor grid 12 and grain-transferring mechanism 31 in detail. Formed in grid 12 are a plurality of openings or apertures 33 arranged in rows, each row having a rod 34 which is rotatably attached to grid 12 by means of brackets 30. Associated with each of the openings 33 is a closure member 35 that is firmly attached to the appropriate rod 34. All of the closure members 35 are connected to their respective rods 34 in the same position so that rotation of a rod 34 causes simultaneous opening and closing of the closure members 35 with respect to the openings 33.

Also attached to each rod 34 is a first extension member 36, all such members 36 being aligned as shown in FIG. 2. Pivotally connected to each of the extension members 36 is a bar 37, which extends outside bin 11 for operation by handle 32 (FIG. 1). Thus, by means of bar 37, extension members 36 and rods 34, the closure members 35 can open and close apertures 33 by movement of handle 32.

Each of the rods 34 also has firmly attached to it a second shorter extension member 38 which is used in combination with a coil spring 39 which biases a row of closure members 35 to a closed position. This is done by connecting spring 39 in tension between extension 38 and a connecting member 40 that is attached to floor grid 12.

FIGS. 4, 5 and 6 disclose the grain-distributing apparatus 14 in detail. The grain-carrying portions of mechanism 14 include a grain-receiving tube 41 and a grain-distributing tube 42 which are joined to form a right angle. Tube 41 is rotatable about its longitudinal axis by virtue of a support 43 at the top of bin 11 (FIG. 1), while the outer end of tube 42 is supported by a track 58, which extends around the periphery of bin 11.

As shown in FIG. 4, an auger 44 is employed to advance grain through tube 42, the outer end of which is open. Auger 44 is rotatably supported by bearing supports 45, 46, located in the opposite ends of tube 42, and is powered at its inner end by an electric motor 47, mounted on tube 41 by means of a bracket 48, coupled with pulleys 49, 50 and a drive belt 51.

As best seen in FIG. 6, auger 44 extends through bearing support 46 at the outer end of tube 42 and terminates within a carriage frame 52. Forming a part of the carriage frame assembly are a central gear 53, which is driven by auger 44, two outer gears 54, 55 and two pulleys 56, 57, all of which are carried by frame 52 and driven by central gear 53. Pulleys 56, 57 ride on the track 58 which lies at the periphery of bin 11 and enables tube 42 to be carried around over the entire surface of upper floor grid 12.

Longitudinally spaced along the front side of tube 42 are a plurality of openings 61 through which grain may pass after being advanced by auger 44. As shown in FIG. 4, the relative position of holes 61 progresses toward the outer end of tube 42 in a gradual spiral to compensate for uneven distribution caused by the different circumferential travel of the holes 61.

Referring now to FIG. 5, there is associated with each of the openings 61 a closure member 62 which is pivotally connected to tube 42 as shown at 63. Closure member 62 is biased to a normally open position by a coil spring 64 connected in tension to member 62 and a rail 65 which is disposed above and supported by tube 42. In order to limit the upward movement of each closure member 62, a limit stop is provided consisting of a leg member 66 which is mounted on member 62 and abuts rail 65 when the limit position is reached.

As shown in FIGS. 4, 5, each of the closure members 62 has an extended portion 67 which engages grain that has reached a predetermined level along the annular area over which it passes. Upon engagement of the grain by extension member 67, closure member 62 is closed against its associated opening 61 to prevent further distribution of grain over that particular annular area.

The spiral arrangement of holes 61 along tube 42 establishes the volume of grain passing through a hole as a direct function of its distance from the center. This compensates for the circumferential distance traveled by a hole, which also varies as a function of the distance from center. Thus, distributioon of grain on upper floor grid 12 progresses evenly until all openings 61 are closed by their respective closure members 62, at which time all of the grain passes through the outer open end of tube 42. When the predetermined level is reached at the outer edge of floor grid 12, switch 20 is actuated and the grain-distributing mechanism is stopped.

An alternative grain-transferring mechanism associated with upper floor grid 12 is disclosed in FIGS. 7, 8 and 9. In this embodiment, a plurality of openings 71 are formed in rows in the upper floor grid 12, each of which has a sliding closure member 72. FIG. 9 shows that the closure members 72 are mounted for sliding movement between an angle bracket 73 connected to floor grid 12 and flanges 74 and 75 that extend from floor grid 12 and form a groove in which closure member 72 can slide. All of the closure members 72 in a single row are joined by a rail 76, thus enabling the connected closure member 72 to be moved simultaneously.

As best shown in FIG. 7, the underside of floor grid 12 includes supporting cross members 81, 82 that provide rigidity and stability. By means of a plurality of brackets 78, a rod 77 extending diametrically across floor grid 12 is connected to the center support 81 (see also FIG. 8). An extended leg member 79 is connected to rod 77 for each of the rows, and a pivotal linkage member 80 joins the leg member 79 with its respective rail 76. Thus, upon rotation of rod 77 by an outside handle not shown, all of the sliding closure members can be simultaneously actuated to open or close openings 71.

In operation, grain entering opening 15 at the top of bin 11 is evenly distributed over upper floor grid 12 by the distributing mechanism 14 until a level is reached at the outer edge that actuates switch 20 to stop the process. The blower 17 and heating unit 18 are then activated to provide hot air to bin 11 through duct 19, and the grain is thus dried by the flow of such air through the upper floor grid 12 and the grain. Upon completion of the drying process, the openings in upper floor grid 12 are uncovered by either of the grain-transferring mechanism described above, thus allowing the grain to fall to the lower floor grid 13 at a rate that is sufficiently fast but controlled to the extent that floor grid 13 is not damaged by excessive falling weight. The plurality of openings in upper floor grid 12, of course, enable the grain to remain evenly distributed as it falls to the lower floor grid 13.

The blower 23 can then be activated to provide cooling and ventilating air to the stored grain through the duct 24, plenum 26 and floor grid 13.

What is claimed is:

1. Apparatus for drying and storing granular material, comprising:
   (a) a storage bin having a first floor and a second floor, the second floor disposed above the first floor;
   (b) means for receiving the granular material from outside the storage bin and evenly distributing the granular material over the second floor; and
   (c) heating apparatus associated with the second floor for heating and drying the evenly distributed granular material;
   (d) the second floor comprising
      (1) a floor structure formed from an open grid the openings of which are smaller than the granular material; and
      (2) a plurality of apertures larger than the granular material disposed in the floor structure, the apertures being uniformly arranged in rows throughout said floor structure to effect even distribution of said granular material as it falls from the second floor to the first floor;
   (e) a closure member for each of the apertures, each of said closure members being pivotally mounted below the second floor; and
   (f) means for simultaneously operating the closure members between open and closed positions, comprising
      (1) an elongated member for each row, each elongated member disposed essentially parallel to its respective row and mounted to the floor structure for rotation about its longitudinal axis;
      (2) each of the closure members being connected to the appropriate elongated member for movement therewith;
      (3) and means for simultaneously rotating the elongated members.

2. The apparatus as defined by claim 1, wherein:
   (a) the elongated members are rods;
   (b) and the means for simultaneously rotating the rods comprises
      (1) a leg member radially affixed to each of the rods;
      (2) a bar pivotally connected to each of the leg members;
      (3) and handle means for imparting linear movement to the bar.

3. The apparatus as defined by claim 2, and further comprising a coil spring for each row connected in tension between the leg member and the floor structure.

4. The apparatus as defined by claim 1 and further comprising spring means normally biasing the pivotally mounted doors to a closed position.

5. The apparatus as defined by claim 1, wherein the heating apparatus comprises:
   (a) blower means disposed outside the storage bin;
   (b) an air duct joining the blower means with the storage bin between the first and second floors;
   (c) and air heating means disposed in the air duct between the blower means and the storage bin.

6. The apparatus as defined by claim 1, wherein;
   (a) the first floor comprises a floor structure formed from an open grid the openings of which are smaller than the granular material;
   (b) and further comprising
      (1) blower means disposed outside the storage bin;
      (2) and an air duct joining the blower means with the storage bin below the first floor.

References Cited

UNITED STATES PATENTS

| 410,085 | 8/1889 | Gent | 34—173 |
|---|---|---|---|
| 1,921,959 | 8/1933 | Warren | 214—83.2 |
| 2,079,802 | 5/1937 | Hauk | 222—485 X |
| 2,946,132 | 7/1960 | Armstrong | 34—170 |
| 3,416,239 | 12/1968 | Louks | 34—211 |

FOREIGN PATENTS

| 76,185 | 7/1894 | Germany | 222—485 |
|---|---|---|---|

FREDERICK L. MATTESON, Jr., Primary Examiner

H. B. RAMEY, Assistant Examiner